(12) United States Patent
Tsukagoshi (10) Patent No.: US 7,313,072 B2
(45) Date of Patent: Dec. 25, 2007

(54) METHOD FOR RECORDING AND REPRODUCING HOLOGRAPHIC DATA AND HOLOGRAPHIC RECORDING MEDIUM

(75) Inventor: Takuya Tsukagoshi, Tokyo (JP)

(73) Assignee: TDK Corporation, Tokyo (JP)

( * ) Notice: Subject to any disclaimer, the term of this patent is extended or adjusted under 35 U.S.C. 154(b) by 492 days.

(21) Appl. No.: 10/782,072

(22) Filed: Feb. 19, 2004

(65) Prior Publication Data
US 2004/0174797 A1 Sep. 9, 2004

(30) Foreign Application Priority Data
Mar. 3, 2003 (JP) ............................. 2003-055099

(51) Int. Cl.
*G11B 7/00* (2006.01)
(52) U.S. Cl. ..................................... 369/103
(58) Field of Classification Search ................ 369/103, 369/275.3, 44.23, 126
See application file for complete search history.

(56) References Cited

U.S. PATENT DOCUMENTS 5,377,176 A 12/1994 Redfield .................... 369/103
5,917,798 A * 6/1999 Horimai et al. ............. 369/103
7,002,891 B2 * 2/2006 Horimai ..................... 369/103
2002/0041561 A1 4/2002 Tsukamoto et al. ......... 369/103

FOREIGN PATENT DOCUMENTS

| EP | 1 324 322 A1 | 7/2003 |
| JP | 08-314361 | 11/1996 |
| JP | 11-202745 | 7/1999 |
| JP | 2002-123949 | 4/2002 |
| WO | WO 02/15176 A1 | 2/2002 |

* cited by examiner

*Primary Examiner*—Nabil Hindi
(74) *Attorney, Agent, or Firm*—Seed IP Law Group PLLC

(57) ABSTRACT

A holographic recording medium includes a recording layer in which data are to be recorded as phase information of light by projecting a signal beam and a reference beam thereonto, a reflective surface disposed on the opposite side of the recording layer as viewed in the direction of signal beam and reference beam incidence on the holographic recording medium and formed with a convex pattern or a concave pattern having a trapezoidal cross-section, a minimum width of a convex surface of the convex pattern or a concave surface of the concave pattern being set equal to or larger than a beam spot diameter of the signal beam or the reference beam at a diffraction limit thereof. According to the thus constituted holographic recording medium, it is possible to easily remove noise light contained in a signal beam and a reference beam.

4 Claims, 8 Drawing Sheets

METHOD FOR RECORDING AND REPRODUCING HOLOGRAPHIC DATA AND HOLOGRAPHIC RECORDING MEDIUM

BACKGROUND OF THE INVENTION

The present invention relates to a method for recording and reproducing holographic data and a holographic recording medium, and more particularly, to a method for recording and reproducing holographic data and a holographic recording medium which can easily remove noise light contained in a signal beam and a reference beam.

DESCRIPTION OF THE PRIOR ART

The holographic method of recording and reproducing information is known as one method for realizing high-density information recording on a recording medium. In an ordinary holographic recording and reproducing method, information is recorded by overlapping a signal beam and a reference beam on the holographic recording medium to write the interference fringes formed thereby. The information recorded in the recording medium can be reproduced by irradiating the recording medium with the reference beam. The reference beam projected onto the recording medium is diffracted by the diffraction grating formed by the interference fringes, thereby causing two-dimensional information to appear as reproduced information. In such a recording medium, since all of the image information carried by the signal beam is reproduced at one time, high speed reproduction can be realized.

In a conventional method for recording and reproducing holographic information, it is normal to cause a signal beam and a reference beam to enter a holographic recording medium with a predetermined angle therebetween when information is to be recorded and to spatially separate the reproduction light and the reference beam for reproducing information when information is to be reproduced, thereby preventing the reference beam from entering a light detector for detecting the reproduction light and preventing decrease in the Signal to Noise ratio of reproduced information.

However, in the above mentioned conventional method for recording and reproducing holographic information, it is necessary to provide optical components such as an objective lens for projecting the signal beam and the reference beam onto the holographic recording medium and the optical system for recording and reproducing information inevitably becomes large. For solving this problem, it has been proposed to make the optical system for recording and reproducing information small by aligning the optical paths of the signal beam and the reference beam projected onto the holographic recording medium and using a common optical system (See Japanese Patent Application Laid Open No. 2002-123949).

In the proposed arrangement, the signal beam and the reference beam are reflected by a reflective surface on the opposite side of (beyond) the recording layer as viewed in the direction of signal beam and reference beam incidence on the recording medium, and an interference pattern is formed in the recording layer by interference arising between the incident light and the reflected light, thereby recording information therein. Further, when servo operation is performed, a reference clock, address information and the like can be obtained from a pattern of concavities or convexities formed on the reflection plane. The edge portions of the concavities or the convexities are generally sharply formed so that the concave pattern can be formed with optimum accuracy.

In order to achieve holographic recording and reproducing with high sensitivity in a method for recording and reproducing holographic information, it is necessary for the signal beam and the reference beam to be free of noise light. A spatial filter such as a pin-hole is therefore provided in the optical path for the purpose of removing noise light. Further, in order to prevent scattered light (non-collimated light) generated by optical system noise light sources, such as a collimator lens, mirror and the like, from projecting onto the holographic recording medium as noise light, it has further been proposed to provide a spatial filter immediately before the holographic recording medium and cause divergent light emitted from the spatial filter to be directly projected onto the holographic recording medium (See, Japanese Patent Application Laid Open Nos. 08-314361 and 11-202745). Moreover, a holographic recording medium to which a plurality of integrated pin-holes are fixed is known (See, Japanese Patent Application Laid Open No. 11-202745).

However, in the case where a spatial filter is provided immediately before the holographic recording medium in the method for recording and reproducing holographic information using a spatial filter, it is impossible to employ an ordinary optical system which can cause a signal beam and a reference beam to transmit through a Fourier transformation lens, thereby forming a Fourier transformation image in a holographic recording medium. The kind of optical system that can be employed is therefore restricted. Further, it is difficult to employ the above mentioned optical system which is made small by aligning the optical paths of the signal beam and the reference beam projected onto the holographic recording medium so as to enable the signal beam and the reference beam to share a common optical system. Moreover, it is difficult to achieve multiplex recording and utilizable multiplexing modes are restricted.

SUMMARY OF THE INVENTION

It is therefore an object of the present invention to provide a method for recording and reproducing holographic data and a holographic recording medium which can easily remove noise light contained in a signal beam and a reference beam.

The above and other objects of the present invention can be accomplished by a holographic recording and reproducing method for recording holographic data in and reproducing holographic data from a holographic recording medium comprising at least a recording layer in which data are to be recorded as phase information of light by projecting a signal beam and a reference beam thereonto, a beam spot incidence region for the signal beam and the reference beam disposed on the opposite side of the recording layer as viewed in the direction of signal beam and reference beam incidence on the holographic recording medium and a filter region formed in at least a part of a periphery of the beam spot incidence region, the holographic recording and reproducing method comprising steps of setting a beam spot diameter of the signal beam or the reference beam at a diffraction limit thereof equal to or smaller than a minimum width of the beam spot incidence region and projecting the signal beam or the reference beam onto the holographic recording medium.

According to the present invention, it is possible to easily remove noise contained in the signal beam and the reference beam and various multiplexing modes such as shift multiplexing, angular multiplexing and the like can be employed without any restriction imposed on utilizable optical systems.

The above and other objects of the present invention can be also accomplished by a holographic recording medium comprising at least a recording layer in which data are to be recorded as phase information of light by projecting a signal beam and a reference beam thereonto, a beam spot incidence region of the signal beam and the reference beam disposed on the opposite side of the recording layer as viewed in the direction of signal beam and reference beam incidence on the holographic recording medium and a filter region formed in at least a part of a periphery of the beam spot incidence region, a minimum width of the beam spot incidence region being set equal to or larger than a beam spot diameter of the signal beam or the reference beam at a diffraction limit thereof.

In a preferred aspect of the present invention, the beam spot incidence region and the filter region have different optical constants from each other.

In a further preferred aspect of the present invention, the beam spot incidence region is constituted as a reflection region of the signal beam and the reference beam, and the filter region is constituted as an absorption region of the signal beam and the reference beam.

The above and other objects of the present invention can be also accomplished by a holographic recording medium comprising at least a recording layer in which data are to be recorded as phase information of light by projecting a signal beam and a reference beam thereonto, a reflective surface disposed on the opposite side of the recording layer as viewed in the direction of signal beam and reference beam incidence on the holographic recording medium and formed with a convex pattern or a concave pattern having a trapezoidal cross-section, a minimum width of a convex surface of the convex pattern or a concave surface of the concave pattern being set equal to or larger than a beam spot diameter of the signal beam or the reference beam at a diffraction limit thereof.

In a preferred aspect of the present invention, the convex surface of the convex pattern or the concave surface of the concave pattern is shaped substantially circular in the direction of the signal beam or the reference beam incident on the holographic recording medium.

According to this preferred aspect of the present invention, since inclined surfaces are formed over 360 degrees, it is possible to reliably remove noise components present over 360 degrees about the optical axis.

In another preferred aspect of the present invention, the convex surface of the convex pattern or the concave surface of the concave pattern is shaped to be band-like in the direction of the signal beam or the reference beam incident on the holographic recording medium.

According to this preferred aspect of the present invention, since the convex surface of the convex pattern or the concave surface of the concave pattern is constituted by continuous flat surfaces, the amount of shift can be reduced in comparison with a discrete convex pattern and the degree of multiplexing can be increased in shift multiplexing.

The above and other objects and features of the present invention will become apparent from the following description made with reference to the accompanying drawings.

DESCRIPTION OF THE PREFERRED EMBODIMENTS

Figure 1:
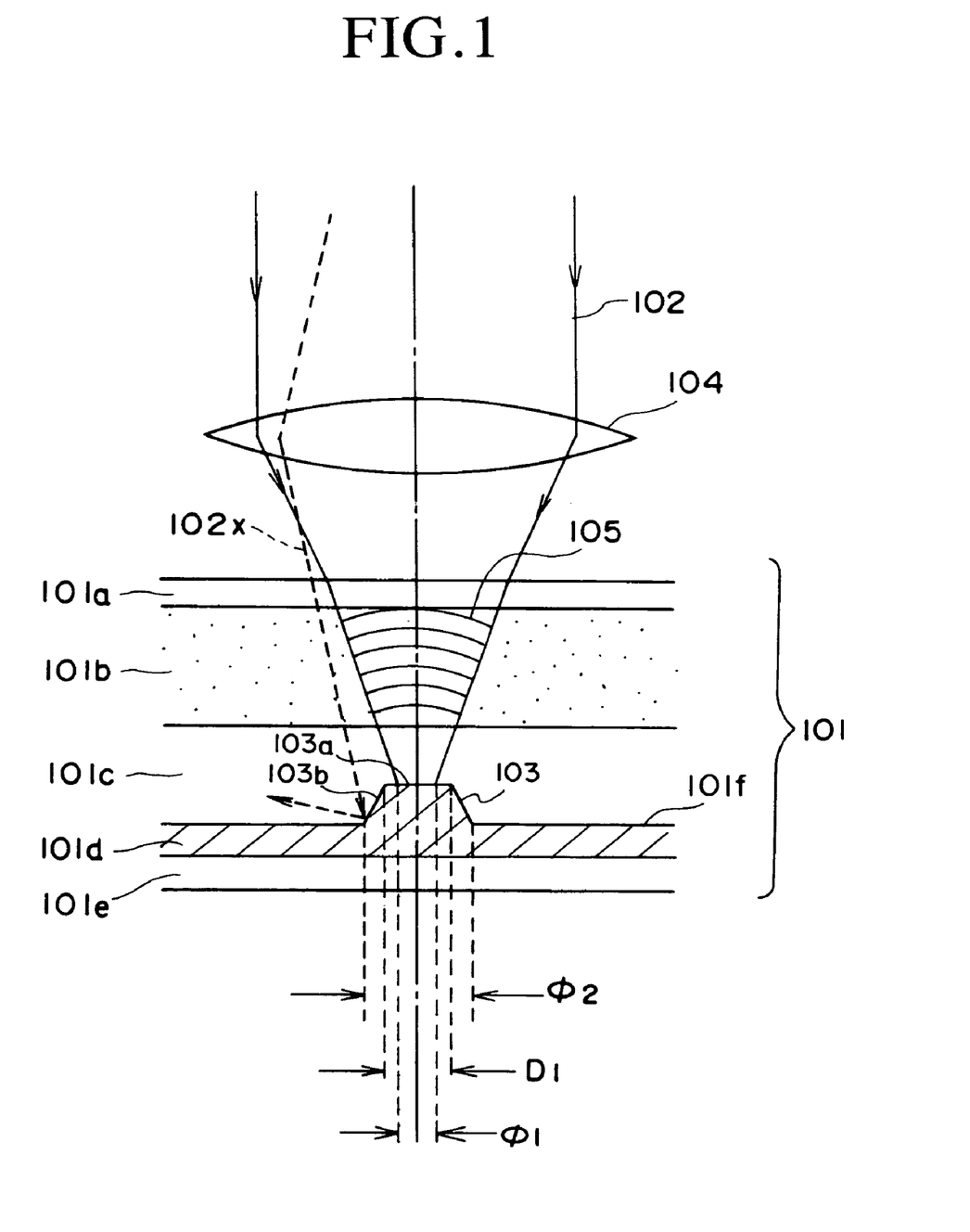
FIG. 1 is a schematic diagram showing the principle of the holographic recording and reproducing that is a preferred embodiment of the present invention.
Figure 2:
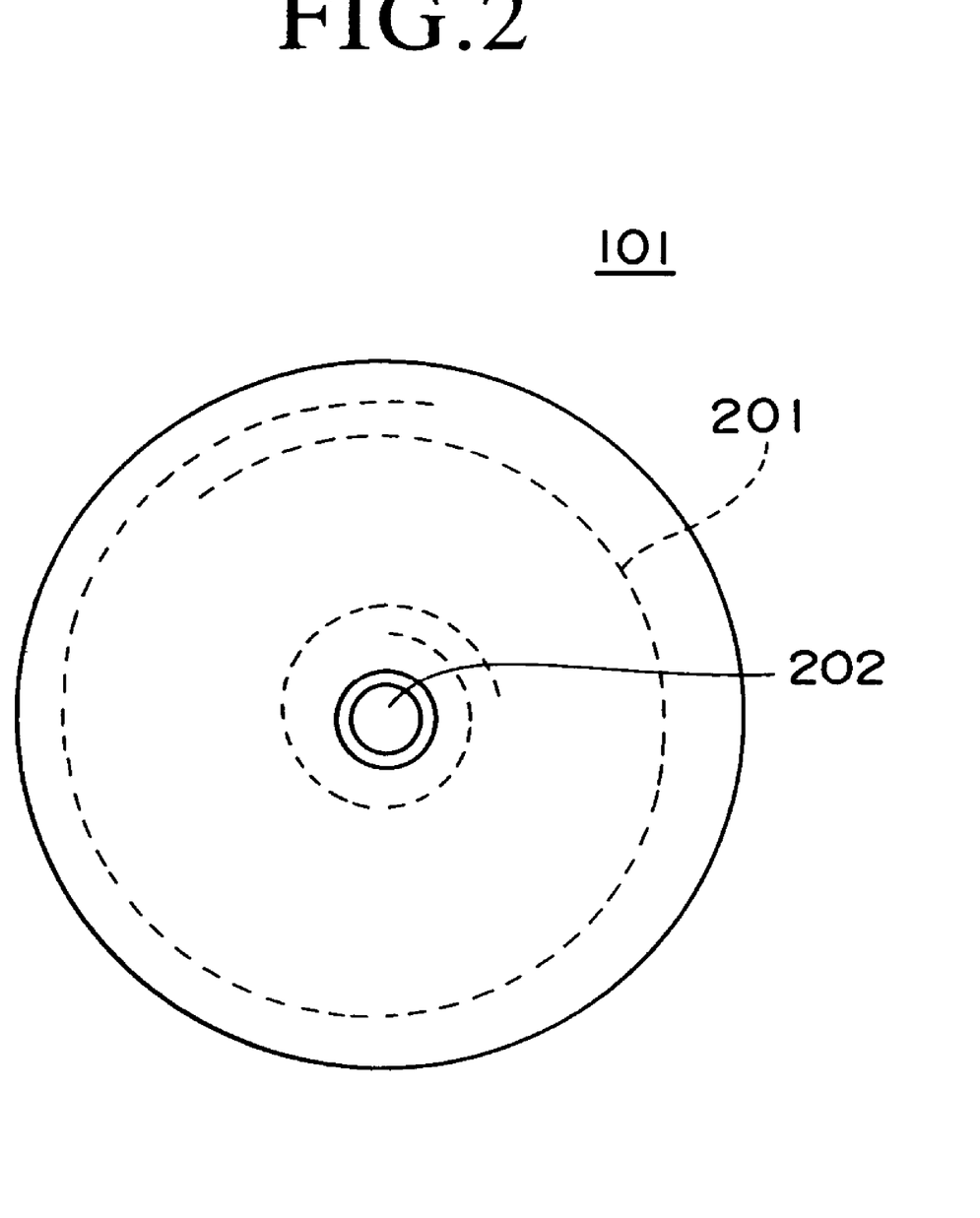
FIG. 2 is a schematic cross-sectional view showing a holographic recording medium that is a preferred embodiment of the present invention.

FIG. 1 is a schematic diagram showing the principle of the holographic recording and reproducing that is a preferred embodiment of the present invention and FIG. 2 is a schematic plan view showing a holographic recording medium that is a preferred embodiment of the present invention.

As shown in FIG. 1, a holographic recording medium 101 according to this embodiment includes a light transmission layer 101a, a recording layer 101b, an intermediate layer 101c, a reflective layer 101d and a protective layer 101e in this order.

The light transmission layer 101a serves as a substrate for physically and chemically protecting the recording Layer and ensuring mechanical strength required for the holographic recording medium 101.

It is necessary for the light transmission layer 101a to have a sufficiently high light transmittance with respect to a signal beam and a reference beam and substantially the same refractive index as that of the recording layer 101b in order to prevent a light beam from being reflected at the interface between itself and the recording layer 101b. As the light transmission layer 101a, a transparent substrate made of polycarbonate is employed, for example.

The recording layer 101b is a layer in which information is recorded holographically, which is formed of a photosensitive material whose optical properties such as a refractive index, dielectric constant, reflection coefficient and the like vary with the intensity of light projected thereonto. A photosensitive material used for forming the recording layer 101a has high photosensitivity to a signal beam and a reference beam but low photosensitivity to a position control beam. Otherwise, a position control beam having a wavelength $\lambda 1$ which does not influence the recording layer 101b is selected. Materials usable for forming the recording layer 101b include photopolymer "HRF-600" (Product Name) manufactured by DuPont, photopolymer "ULSH-500" (Product Name) manufactured by Aprilis, Inc. and the like.

The reflective layer 101d is formed of aluminum, for example. One surface of the reflective layer 101d in contact with the intermediate layer 101c constitutes a reflective surface 101f for reflecting a light beam for recording information or reproducing information.

The protective layer 101e serves to protect the reflective layer 101d. Unlike the light transmission layer 101a, the protective layer 101e does not transmit any signal beam, reference beam or position control beam and therefore does not require optical transparency.

The intermediate layer 101c serves to provide a gap between the recording layer 101b and the reflective layer 101d so that a light beam can be condensed on the recording layer 101b so as to have a predetermined beam spot diameter and be focused onto a predetermined position on the reflective layer 101d. The intermediate layer 101c also serves to prevent the recording layer 101b from being degraded.

The intermediate layer 101c can be formed of a transparent substrate made of polycarbonate but may be formed as an air gap instead of a transparent substrate.

A light beam 102 such as a signal beam, a reference beam or the like is projected onto the holographic recording medium 101 from the side of the light transmission layer 101a, thereby recording information therein or reproducing information therefrom.

One surface of the reflective layer 101d in contact with the intermediate layer 101c serves as a reflective surface and the reflective surface is formed with a convex pattern 103.

The convex pattern 103 serves to provide a reference clock and address information necessary for holographic recording and reproducing. The convex pattern 103 has a trapezoidal shape whose upper side is shorter than the lower side thereof. The upper surface 103a of the convex pattern 103 is flat and the side surface thereof is constituted as an inclined surface 103b having a predetermined angle.

The thus constituted holographic recording medium 101 is irradiated with a signal beam and a reference beam via an objective lens.

When information is to be recorded in the holographic recording medium 101, the collimated signal beam and reference beam coaxially impinge on an objective lens 104 so that the optical paths of the signal beam and the reference beam are aligned with each other and the signal beam and the reference beam are focused by the objective lens 104 onto the reflective surface 101f, whereby the holographic recording medium 101 is irradiated with the signal beam and the reference beam.

On the other hand, when information is to be reproduced from the holographic recording medium 101, only the collimated reference beam impinges on the objective lens 104 and is focused by the objective lens 104 onto the reflective surface 101f, whereby the holographic recording medium 101 is irradiated with the reference beam.

At this time, each of the light beams is condensed onto the reflective surface 101f so that the beam spot diameter at the diffraction limit thereof falls within the upper surface 103a of the convex pattern 103. In other words, the optical system is configured so that Φ1 is equal to or smaller than D1 and Φ2 is equal to or larger than D1, where Φ1 is a beam spot diameter at the diffraction limit of each of the light beams, Φ2 is an actual beam spot diameter of the light beam and D1 is the minimum width of the upper surface 103a of the convex pattern 103, and the light beam is projected onto the holographic recording medium 101.

The beam spot diameter Φ1 at the diffraction limit of each of the light beams depends upon the wavelength λ of the light beam and the numerical aperture NA of the objective lens 104. Therefore, in the case where the numerical apertures NA of objective lenses used for the signal beam and the reference beam are different from each other, the values of Φ1 are different from each other. The beam spot of the light beam may have an elliptic shape depending upon the incident angle thereof and in such a case, Φ2 is defined as the diameter of the ellipse in the direction of the minimum width D1 of the upper surface 103a of the convex pattern 103 or on the long axis side thereof. The angle of the inclined surface 103b of the convex pattern 103 is defined taking into account the height of the convex pattern 103 and the spot diameters Φ1 and Φ2 of the light beam 102 on the reflective surface 101f and is preferably set to be 45 degrees.

The part of the actual light beam having a beam spot diameter Φ2 that falls within the beam spot diameter Φ1 is an accurately collimated and condensed light beam that is reflected by the upper surface 103a of the convex pattern 103 and returned along the same optical path as that of the incident beam 102. In other words, the part of the reflective surface 101f serving as the reflection region is the upper surface 103a of the convex pattern 103.

Accordingly, when information is to be recorded in the recording layer 101b, an interference pattern 105 is three-dimensionally formed in a region of the recording layer 101b through which the light beam is transmitted, thereby recording information in the recording layer 101b. On the other hand, when information is to be reproduced from the recording layer 101b, the reference beam is projected onto the interference pattern 105, thereby modulating the reference beam to generate a reproduced beam. The region of the recording layer 101b through which the light beam is transmitted is defined as a region of the recording layer 101b through which an amount of light equal to $1/e^2$ of the maximum intensity of the light beam passes.

On the other hand, the light beam 102 having the beam spot diameter Φ2 and projected onto a region outside of the region of the beam spot diameter Φ1 is not collimated and the region outside of the region of the beam spot diameter Φ1 is irradiated with a non-collimated beam. It can be therefore considered that this light beam 102x causes noise in holographic recording and reproduction and that it is possible to prevent the noise-causing light beam 102x from returning to and entering the objective lens 104 by causing the light beam 102x to impinge onto the inclined surface 103b of the convex pattern 103, thereby diffusing it. Accordingly, the inclined surface 103b of the convex pattern 103 of the reflective surface 101f serves as a filter region and it is therefore possible to use the convex pattern 103 as a spatial filter for removing noise components from the signal beam and the reference beam.

As shown in FIG. 2, the holographic recording medium 101 according to this embodiment has a disk-like shape. A track 201 is spirally formed on the holographic recording medium 101 so as to extend from an inside portion of the holographic recording medium 101 toward the outer circumference thereof. The above mentioned convex pattern 103 is provided on the track 201 and holograms (interference patterns 105) are recorded thereon. For easy handling of the holographic recording medium 101, it is preferable to form a hole 202 at a central portion of the holographic recording medium 101 and form the holographic recording medium 101 so as to have substantially the same outer diameter and thickness, namely, 120 mm and 1.2 mm as those of a CD or a DVD. The holographic recording medium 101 may be formed with coaxial tracks 201 instead of the spiral track 201.

Figure 3:
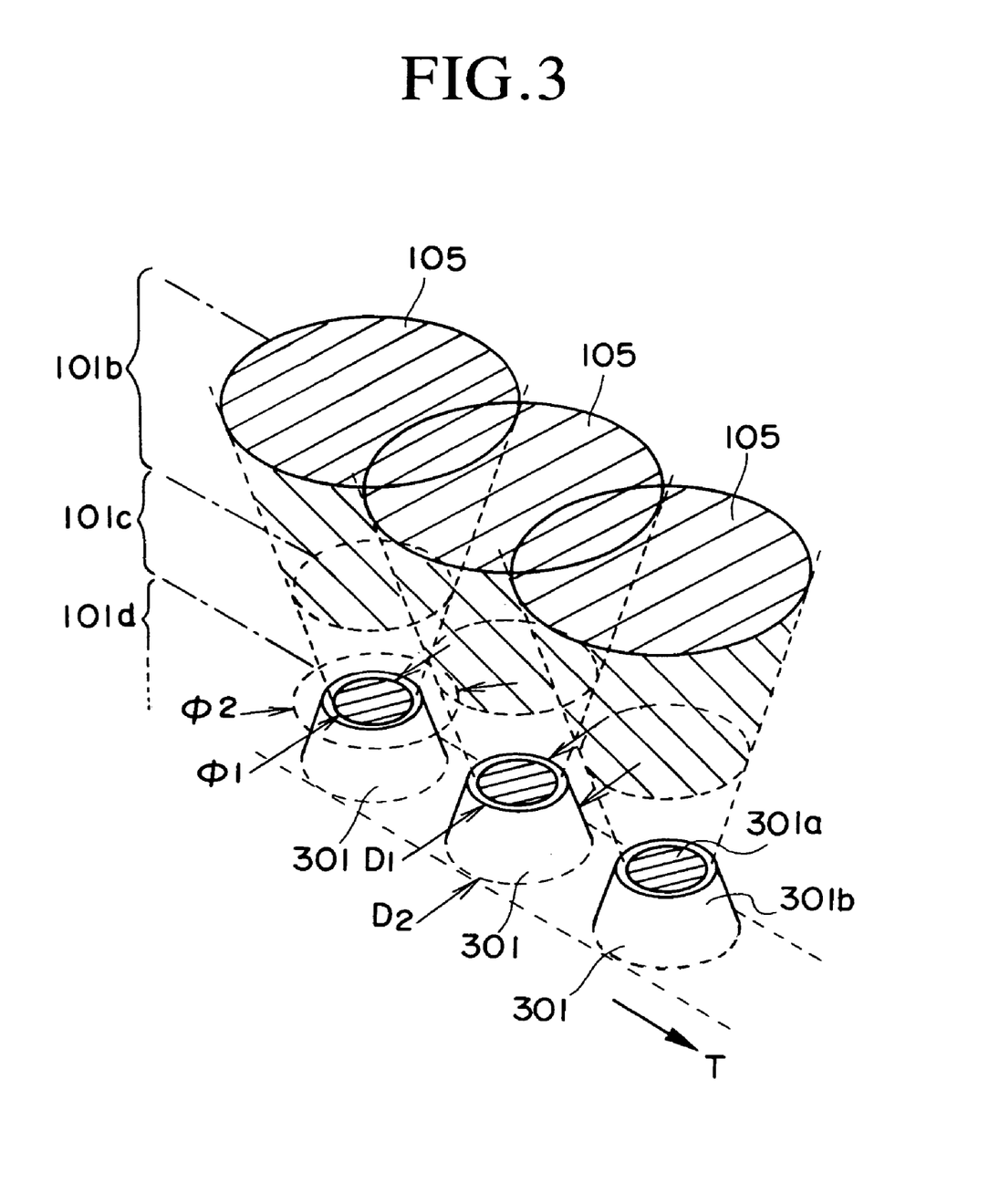
FIG. 3 is a schematic perspective view showing a convex pattern formed on a track.

FIG. 3 is a schematic perspective view showing the convex pattern 103 formed on the track 201.

As shown in FIG. 3, the convex pattern 103 is constituted as a number of truncated conical projections 301. The projections 301 are formed along the track 201 in the direction indicated by an arrow T.

Therefore, all of the projections 301 formed perpendicular to the direction of the track have the same cross-sectional shape as that of the convex pattern 103 shown in FIG. 1. The diameter D1 of the upper surface 301a of each projection 301 is set to be equal to or slightly larger than the beam spot diameter $\Phi 1$ at the diffraction limit of each of the signal beam and the reference beam condensed thereonto. The width D2 of the bottom side of each projection 301 is set to be equal to or slightly larger than the actual beam spot diameter $\Phi 2$ of each of the signal beam and the reference beam condensed thereonto.

Since that part of the light beam 102 of beam spot diameter $\Phi 2$ incident on the holographic recording medium 101 that is accounted for by the non-collimated beam incident on a region outside of the region of the beam spot diameter $\Phi 1$ is reflected by the inclined surface 301b of the projection 301 and diffuses, the projections 301 can be used as a spatial filter. In particular, since each projection 301 is formed with the inclined surface over 360 degrees, it is possible to reliably remove noise present over 360 degrees about the optical axis of the light beam projected thereonto.

Moreover, in the case where the projections 301 are formed at relatively short intervals along the track 301 as shown in FIG. 3, it is possible to achieve shift multiplexing so that neighboring holograms 105 in the recording layer 101b overlap each other. Multiplexing other than shift multiplexing, such as angular multiplexing, phase code multiplexing and the like, can be also achieved.

Figure 4:
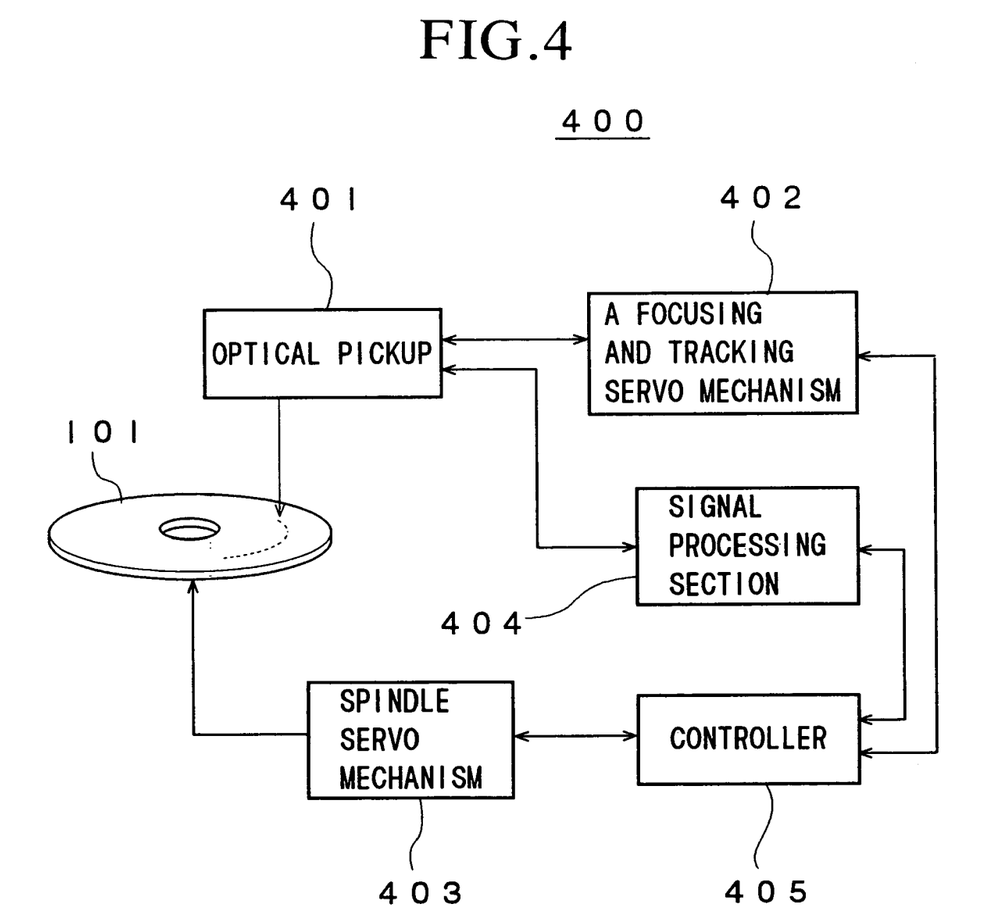
FIG. 4 is a block diagram of a holographic recording and reproducing apparatus for performing holographic recording and reproduction that is a preferred embodiment of the present invention.

FIG. 4 is a block diagram of a holographic recording and reproducing apparatus for performing holographic recording and reproduction that is a preferred embodiment of the present invention.

As shown in FIG. 4, a holographic recording and reproducing apparatus 400 includes an optical pickup 401 for generating a signal beam and a reference beam, a focusing and tracking servo mechanism 402 for controlling the focusing and tracking of the optical pickup 401, a spindle servo mechanism 403 for controlling the rotation of the disc-like holographic recording medium 101, a signal processing section 404 for processing signals output from the optical pickup 401, and a controller 405 for controlling these means.

Figure 5:
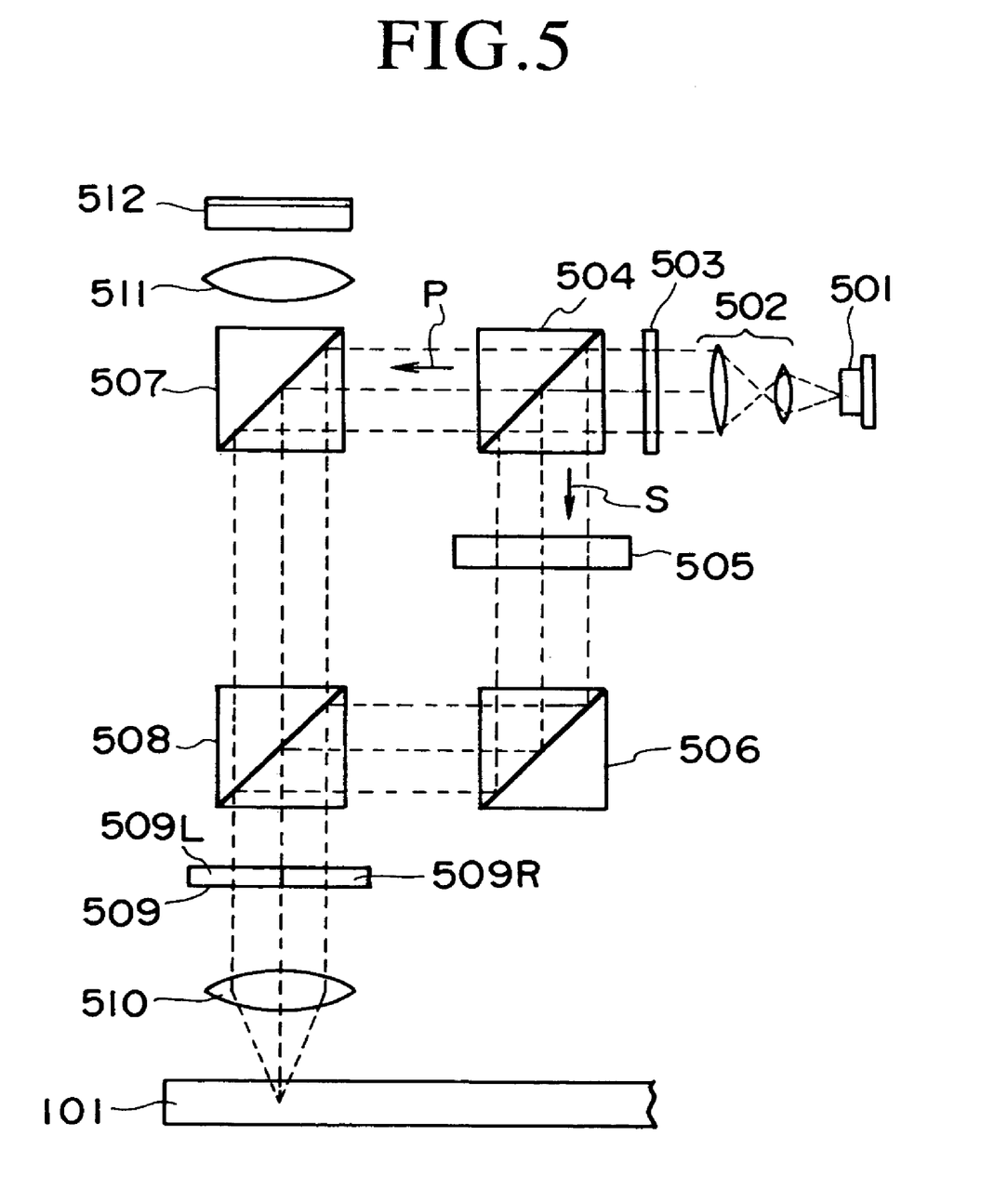
FIG. 5 is a block diagram showing the configuration of an optical pickup.

FIG. 5 is a block diagram showing the configuration of the optical pickup 401.

As shown in FIG. 5, the optical pickup 401 includes a laser beam source 501, a beam expander 502, a rotating optical element 503, a first polarizing beam splitter 504, a spatial light modulator 505, a first mirror 506, a second mirror 507, a second polarizing beam splitter 508, a double optically rotating plate 509, a Fourier transformation lens 510, an image forming lens 511, and a CCD image sensor 512.

A light beam generated by the laser beam source 501 passes through the beam expander 502, whereby it is enlarged in diameter and collimated, and the light beam is then optically rotated by the rotating optical element 503, thereby dividing it so as to contain an S polarization component and a P polarization component. The light beam then enters the first polarizing beam splitter 504.

The first polarizing beam splitter 504 is adapted to reflect the S polarization component of the light beam transmitted through the rotating optical element 503 and transmit the P polarization component thereof. One of the light beams generated by dividing the light beam at the first polarizing beam splitter 504 impinges onto the second mirror 507 as a signal beam or a reference beam. The other light beam generated by dividing the light beam at the first polarizing beam splitter 504 enters the spatial light modulator 505.

The spatial light modulator 505 has a large number of pixels arranged in a matrix and spatially modulates the intensity of the other light beam by selectively passing or blocking the light beam at each pixel. A liquid crystal device or a DMD (digital micro-mirror device), for example, is used as the spatial light modulator 505.

When information is to be recorded in the holographic recording medium 101, a signal beam having a predetermined pattern is generated by selectively turning on or off the pixels of the spatial light modulator 505 in accordance with data to be recorded. The signal beam advances to the first mirror 506. On the other hand, when information is to be reproduced from the holographic recording medium 101, the light beam is blocked by turning off all of the pixels of the spatial light modulator 505.

The first mirror 506 and the second mirror 507 are constituted so as to reflect only light emitted from the laser beam source 501. The signal beam or the reference beam reflected by the first mirror 506 or the second mirror 507 impinges on the second beam splitter 508.

The second beam splitter 508 is constituted so as to reflect the S polarization component of the light beam and transmit the P polarization component thereof. Therefore, when information is to be recorded in the holographic recording medium 101, only the coaxial signal beam and reference beam whose optical paths are brought into line with each other enter the double optically rotating plate 509 and when information is to be reproduced from the holographic recording medium 101, only the reference beam enters the double optically rotating plate 509.

The double optically rotating plate 509 includes a polarizing plate 509R disposed on the right side of the optical path and a polarizing plate 509L disposed on the left side of the optical path. The polarizing plate 509R disposed on the right side is constituted so as to rotate the direction of polarization by −45 degrees and the polarizing plate 509L disposed on the left side is constituted so as to rotate the direction of polarization by +45 degrees. In this embodiment, the linear polarized light generated by rotating the S polarized light by −45 degrees or rotating the P polarized light by +45 degrees is defined as A polarized light and the linear polarized light generated by rotating the S polarized light by +45 degrees or rotating the P polarized light by −45 degrees is defined as B polarized light. The directions of polarization of the A polarized light and the B polarized light are perpendicular to each other. The signal beam and the reference beam passing through the double optically rotating plate 509 enter the Fourier transformation lens 510.

When information is to be recorded in the holographic recording medium 101, the signal beam and the reference beam enter the Fourier transformation lens 510 and are focused by the Fourier transformation lens 510 onto the reflective surface of the holographic recording medium 101. The signal beam and the reference beam enter the holographic recording medium 101 perpendicularly thereto and pass through the recording layer 101b. The signal beam and the reference beam are then reflected by the reflective surface and return along the same optical path as that of the incident beams. Therefore, an interference pattern is three-dimensionally formed by interference between the incident beam component and reflected light beam component of the signal beam and reference beam in the region of the recording layer 101b through which the signal beam and the reference beam pass, thereby recording information in the recording layer 101b.

On the other hand, when information is to be reproduced from the holographic recording medium 101, the reference beam is modulated by the interference pattern to generate a reproduced beam.

The reference beam enters the Fourier transformation lens 510 and is focused by the Fourier transformation lens 510 onto the reflective surface of the holographic recording medium 101. The reference beam enters the holographic recording medium 101 perpendicularly thereto and passes through the recording layer 101b. The reference beam is then reflected by the reflective surface and returns along the same optical path as that of the incident beam.

The reference beam enters the second beam splitter 508 and passes through the second beam splitter 508, the first mirror 507 and the image forming lens 511 to impinge onto the CCD image sensor 512. The on-off pattern generated by the spatial light modulator 505 when information was recorded is formed on the CCD image sensor 512 and information is reproduced by detecting the thus formed pattern.

Figure 6:
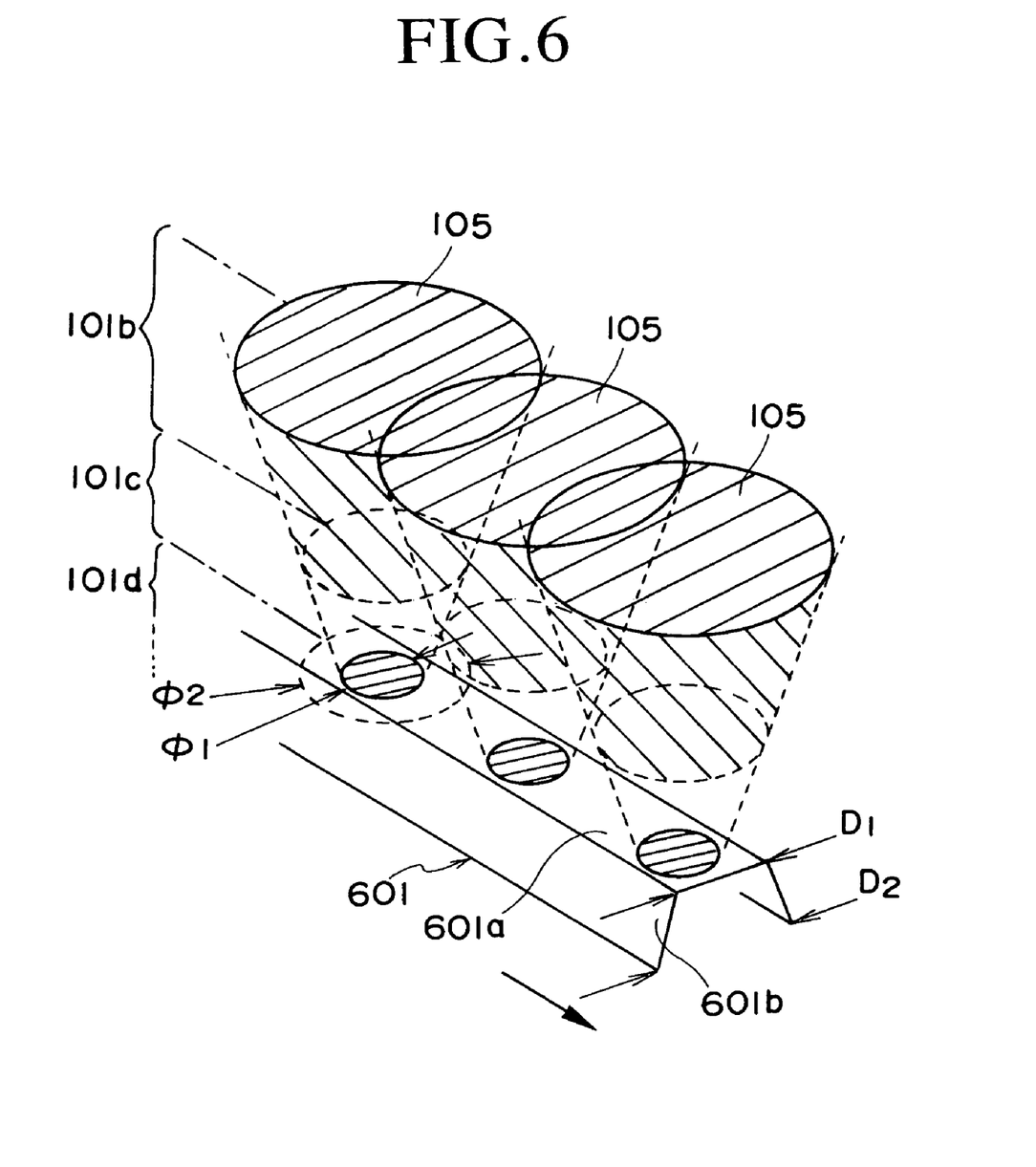
FIG. 6 is a schematic perspective view showing another example of a convex pattern 103.

FIG. 6 is a schematic perspective view showing another example of a convex pattern 103.

As shown in FIG. 6, the convex pattern 103 is constituted as a band-like land 601 extending in the direction of the track. Therefore, the land 601 formed perpendicular to the track extending in the direction indicated by an arrow has the same cross-sectional shape as that of the convex pattern 103 shown in FIG. 1. The width D1 of the upper side of the land 601 is set to be equal to or slightly larger than the beam spot diameter $\Phi1$ at the diffraction limit of each of the signal beam and the reference beam condensed thereonto. The width D2 of the bottom side of the land 601 is set to be equal to or slightly larger than the actual beam spot diameter $\Phi2$ of each of the signal beam and the reference beam condensed thereonto.

Since that part of the light beam 102 having the beam spot diameter $\Phi2$ incident on the holographic recording medium 101 that is accounted for by a non-collimated beam incident on a region outside of the region of the beam spot diameter $\Phi1$ is reflected by the inclined surface 601b of the land 601 and diffuses, the land 601 can be used as a spatial filter to improve the characteristics of the holographic recording and reproduction.

Moreover, in the case where the holograms 105 are recorded at relatively short intervals along the track 301 as shown in FIG. 6, it is possible to achieve shift multiplexing so that neighboring holograms 105 overlap each other. In particular, since the upper surface 601a of the land 601 is continuous, unlike discrete truncated cone-like projections 301 shown in FIG. 3, the amount of shift can be lowered in comparison with projections 301 and it is therefore possible to increase the degree of multiplexing in shift multiplexing.

As described above, according to this embodiment, since that part of the light beam 102 of beam spot diameter $\Phi2$ incident on the holographic recording medium 101 that is accounted for by the noise-causing non-collimated beam incident on a region outside of the region of the beam spot diameter $\Phi1$ is reflected by the inclined surface of a convex pattern such as a projection 301 or a land and diffuses, it is possible to cause the convex pattern to serve as a spatial filter and improve the characteristics of the holographic recording and reproduction.

Figure 7:
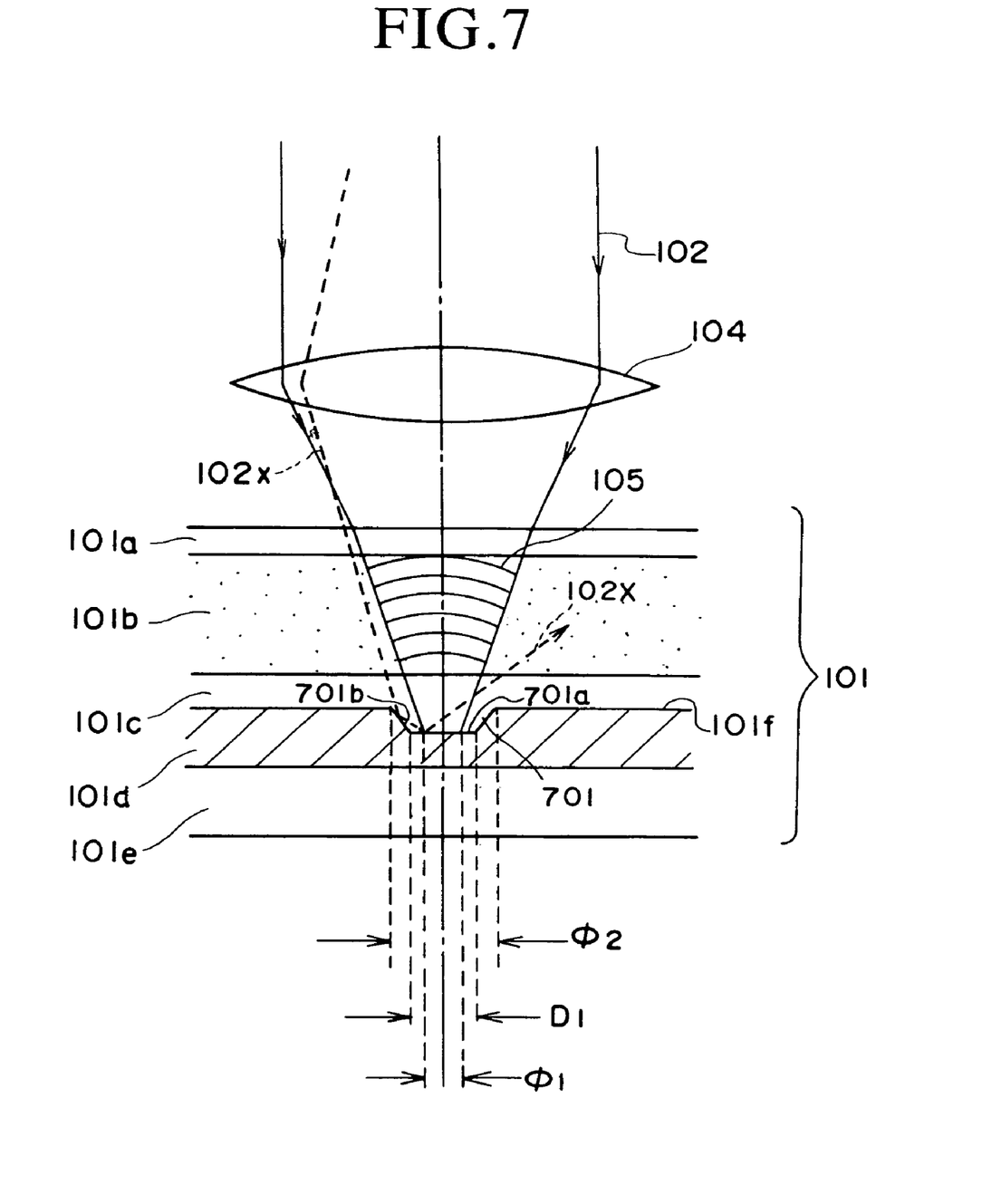
FIG. 7 is a schematic diagram showing the principle of the holographic recording and reproducing that is another preferred embodiment of the present invention.

FIG. 7 is a schematic diagram showing the principle of the holographic recording and reproducing that is another preferred embodiment of the present invention.

As shown in FIG. 7, a holographic recording medium 101 has the same configuration as that of the holographic recording medium 101 shown in FIGS. 1 and 2 except that a concave pattern 701 is formed on the reflective surface 101f.

The concave pattern 701 has a trapezoidal shape whose upper side is longer than the lower side thereof. The bottom surface 701a of the concave pattern 701 is flat and the side surface thereof is constituted as an inclined surface 701b having a predetermined angle.

The light beam 102 is condensed onto the reflective surface 101f so that the beam spot diameter at the diffraction limit thereof falls within the bottom surface 701a of the concave pattern 701. In other words, the optical system is configured so that $\Phi1$ is equal to or smaller than D1 and $\Phi2$ is larger than D1, where $\Phi1$ is the beam spot diameter at the diffraction limit of each of the light beams, $\Phi2$ is the actual beam spot diameter of the light beam and D1 is the minimum width of the bottom surface 701a of the concave pattern 701, and the light beam is projected onto the holographic recording medium 101.

The angle of the inclined surface 701b of the concave pattern 701 is defined taking into account the height of the concave pattern 701 and the spot diameters $\Phi1$ and $\Phi2$ of the light beam 102 on the reflective surface 101f and is preferably set to be 45 degrees.

The part of the light beam 102 of beam spot diameter $\Phi2$ projected onto a region inside the region of the beam spot diameter $\Phi1$ is an accurately collimated and condensed light beam that is reflected by the bottom surface 701a of the concave pattern 701 and returned along the same optical path as that of the incident beam 102.

Therefore, when information is to be recorded in the recording layer 101b of the holographic recording medium 101, an interference pattern (hologram) 105 is three-dimensionally formed in a region of the recording layer 101b through which the light beam is transmitted, thereby recording information in the recording layer 101b. On the other hand, when information is to be reproduced from the recording layer 101b, the reference beam is projected onto the interference pattern (hologram) 105, thereby modulating the reference beam to generate a reproduced beam.

On the other hand, the light beam 102 having the beam spot diameter $\Phi2$ and projected onto a region outside of the region of the beam spot diameter $\Phi1$ is not collimated and the region outside of the region of the beam spot diameter $\Phi1$ is irradiated with a non-collimated beam. It is possible to prevent the noise-causing light beam 102x from returning to and entering the objective lens 104 by causing the light beam 102x to impinge on the inclined surface 701b of the concave pattern 701, thereby diffusing it. Accordingly, the inclined surface 701b of the concave pattern 701 of the reflective surface 101f serves as a filter region and it is therefore possible to use the concave pattern 701 as a spatial filter for removing noise components from the signal beam and the reference beam.

Figure 8:
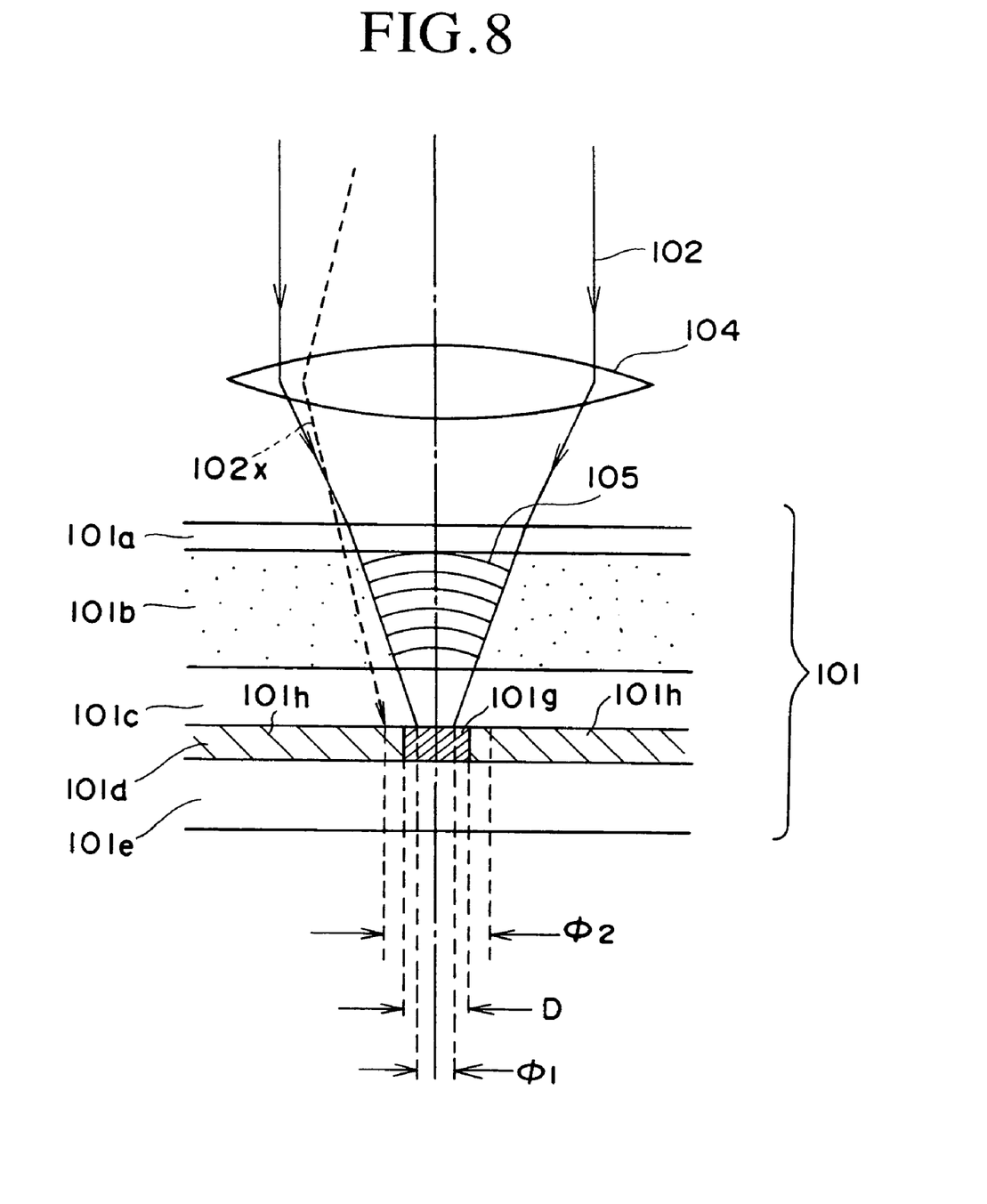
FIG. 8 is a schematic diagram showing the principle of the holographic recording and reproducing that is a further preferred embodiment of the present invention.

FIG. 8 is a schematic diagram showing the principle of the holographic recording and reproducing that is a further preferred embodiment of the present invention.

As shown in FIG. 8, a holographic recording medium 101 according to this embodiment has the same configuration as that of the holographic recording medium 101 shown in FIGS. 1 and 2 except that the reflective layer 101d includes, instead of the convex pattern 103, a reflection region 101g at the region corresponding to the convex pattern 103 and is formed with a filter region 101h made of a light absorbing material around the reflection region 101g.

The light beam 102 is condensed onto the reflective surface 101f so that the beam spot diameter at the diffraction limit thereof falls within the reflection region 101g. In other words, the optical system is configured so that Φ1 is equal to or smaller than D and Φ2 is larger than D, where Φ1 is the beam spot diameter at the diffraction limit of each of the light beams, Φ2 is the actual beam spot diameter of the light beam and D is the minimum width of the reflection region 101g, and the light beam is projected onto the holographic recording medium 101.

The part of the light beam 102 of beam spot diameter Φ2 projected onto a region inside the region of the beam spot diameter Φ1 is an accurately collimated and condensed light beam that is reflected by the reflection region 101g and returned along the same optical path as that of the incident beam 102.

Therefore, when information is to be recorded in the recording layer 101b of the holographic recording medium 101, an interference pattern (hologram) 105 is three-dimensionally formed in a region of the recording layer 101b through which the light beam is transmitted, thereby recording information in the recording layer 101b. On the other hand, when information is to be reproduced from the recording layer 101b, the reference beam is projected onto the interference pattern (hologram) 105, thereby modulating the reference beam to generate a reproduced beam.

On the other hand, the light beam 102 of beam spot diameter Φ2 projected onto a region outside of the region of the beam spot diameter Φ1 is not collimated and the region outside of the region of the beam spot diameter Φ1 is irradiated with a non-collimated beam. It is possible to prevent the noise-causing light beam 102x from returning to and entering the objective lens 104 by causing the light beam 102x to impinge on the filter region 101h to be absorbed thereby. Accordingly, the filter region 101h of the reflective layer 101d serves as a spatial filter for removing noise components from the signal beam and the reference beam.

The present invention has thus been shown and described with reference to specific embodiments. However, it should be noted that the present invention is in no way limited to the details of the described arrangements but changes and modifications may be made without departing from the scope of the appended claims.

For example, the above embodiments were explained with respect to disc-type holographic recording media 101. However, the holographic recording medium is not particularly limited and any of various types of holographic recording media such as card-like, block-like, stick-like or the like can be selected.

Further, it is not absolutely necessary for the holographic recording and reproducing apparatus to have the structure shown in FIG. 4 and for the optical pickup 401 to have the structure shown in FIG. 5 and it is sufficient for them to have an optical system which can collimate a light beam 102 and focus the collimated light beam onto the reflective surface 101f. Moreover, it is not absolutely necessary to project the coaxially signal beam and reference beam when information is to be recorded and it is possible to project one of the light beams 102 onto the reflective surface 101f so that the optical axis thereof is perpendicular to the reflective surface of the holographic recording medium 101 and project the other light beam 102 thereonto so that the optical axis thereof is oblique thereto.

Furthermore, although each of the projections 301 has a truncated cone shape in the above described embodiment, it is not absolutely necessary for each of the projections 301 to have a truncated cone shape and each of the projections 301 may instead have an elliptic truncated cone shape or a long truncated cone shape. It is preferable for the projections 301 to be disposed so that the longer diameter thereof is directed in the direction of the track when shift multiplexing in the track direction is effected.

Moreover, although in the above described embodiments only the convex pattern 103 is formed on the reflective surface 101f of the holographic recording medium 101 or only the concave pattern 701 is formed on the reflective surface 101f of the holographic recording medium 101, both the convex pattern 103 and the concave pattern 701 may be formed on the reflective surface 101f of the holographic recording medium 101.

Further, although in the above described embodiments explanation was made as to the case where the convex pattern 103 or the concave pattern 701 contains a reference clock and address information necessary for holographic recording and reproducing, the convex pattern 103 or the concave pattern 701 may be used solely as a spatial filter.

According to the present invention, it is possible to provide a method for recording and reproducing holographic data and a holographic recording medium which can easily remove noise light contained in a signal beam and a reference beam.

The invention claimed is:

1. A holographic recording medium comprising:
   a recording layer in which data are to be recorded as phase information of light by projecting a signal beam and a reference beam thereonto;
   a reflective layer disposed on an opposite side of the recording layer as viewed in a direction of the signal beam and the reference beam incidence on the holographic recording medium, the reflective layer including a beam spot incidence region for reflecting the signal beam and the reference beam toward the recording layer projected thereonto via the recording layer; and
   a filter region formed at a periphery of the beam spot incidence region and having a property of scattering or absorbing the signal beam and the reference beam projected thereonto via the recording layer, the filter region being configured to receive only a non-collimated portion of the signal beam or the reference beam projected thereonto via the recording layer, a minimum width of the beam spot incidence region being substantially equal to a beam spot diameter of the signal beam or the reference beam at a diffraction limit thereof.

2. The holographic recording medium in accordance with claim 1, wherein the beam spot incidence region and the filter region have different optical constants from each other.

3. The holographic recording medium in accordance with claim 1, wherein the beam spot incidence region is constituted as a reflection region of the signal beam and the reference beam, and the filter region is constituted as an absorption region of the signal beam and the reference beam.

4. The holographic recording medium in accordance with claim 2, wherein the beam spot incidence region is constituted as a reflection region of the signal beam and the reference beam, and the filter region is constituted as an absorption region of the signal beam and the reference beam.

* * * * *